E. R. MORRISON.

STEAM BOILER.

APPLICATION FILED MAR. 27, 1920.

Reissued May 18, 1920.

14,859.

4 SHEETS—SHEET 1.

INVENTOR

Egbert R. Morrison

BY Brockett & Hyde

ATTORNEYS

E. R. MORRISON.

STEAM BOILER.

APPLICATION FILED MAR. 27, 1920.

Reissued May 18, 1920.

14,859.

4 SHEETS—SHEET 2.

INVENTOR

Egbert R. Morrison

BY

Brockett & Hyde

ATTORNEYS

E. R. MORRISON.
STEAM BOILER.
APPLICATION FILED MAR. 27, 1920.
Reissued May 18, 1920.
14,859.
4 SHEETS—SHEET 3.
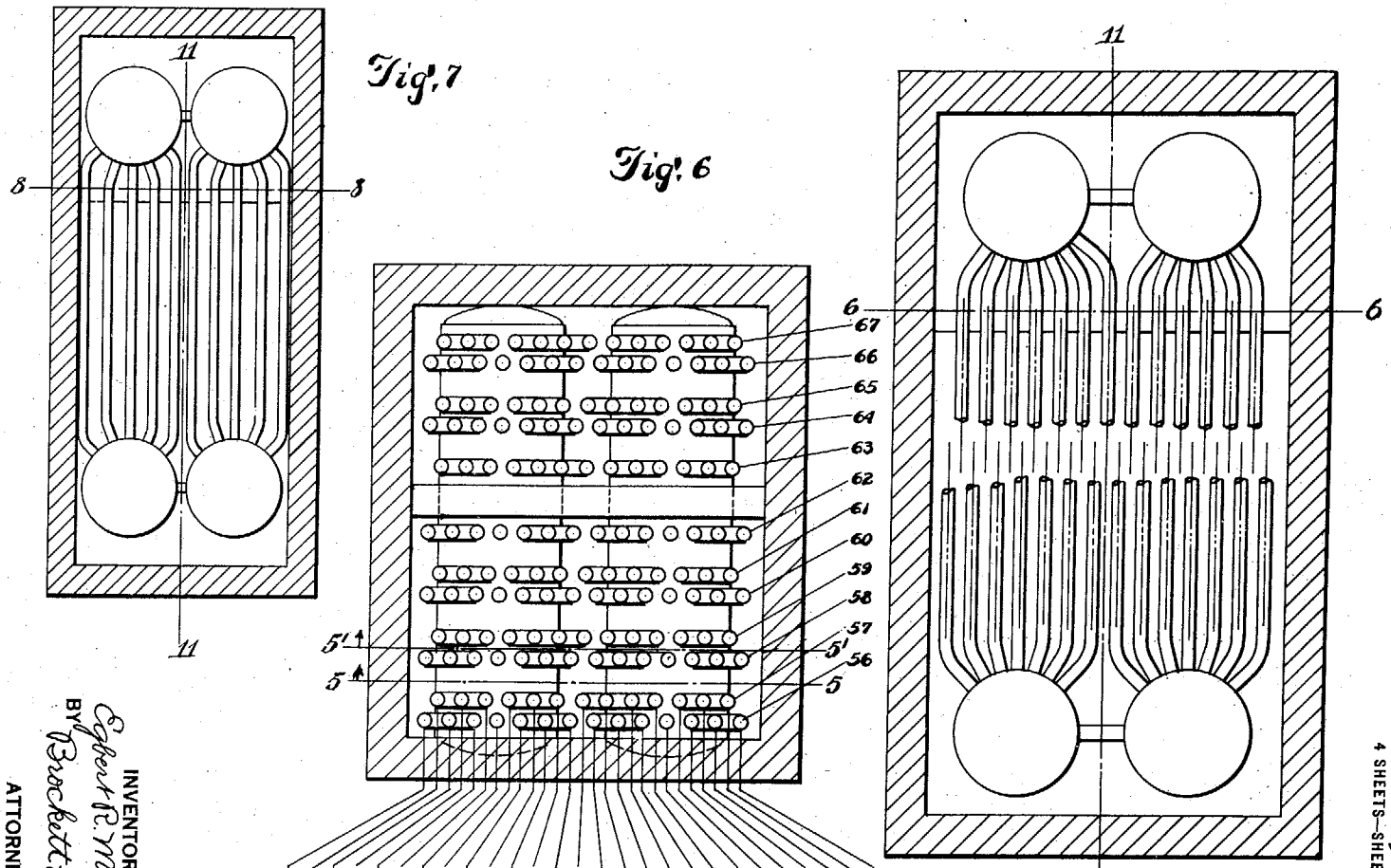
INVENTOR
Egbert R. Morrison
BY Brockett & Hyde
ATTORNEYS E. R. MORRISON.
STEAM BOILER.
APPLICATION FILED MAR. 27, 1920.
Reissued May 18, 1920.
14,859.
4 SHEETS—SHEET 4.
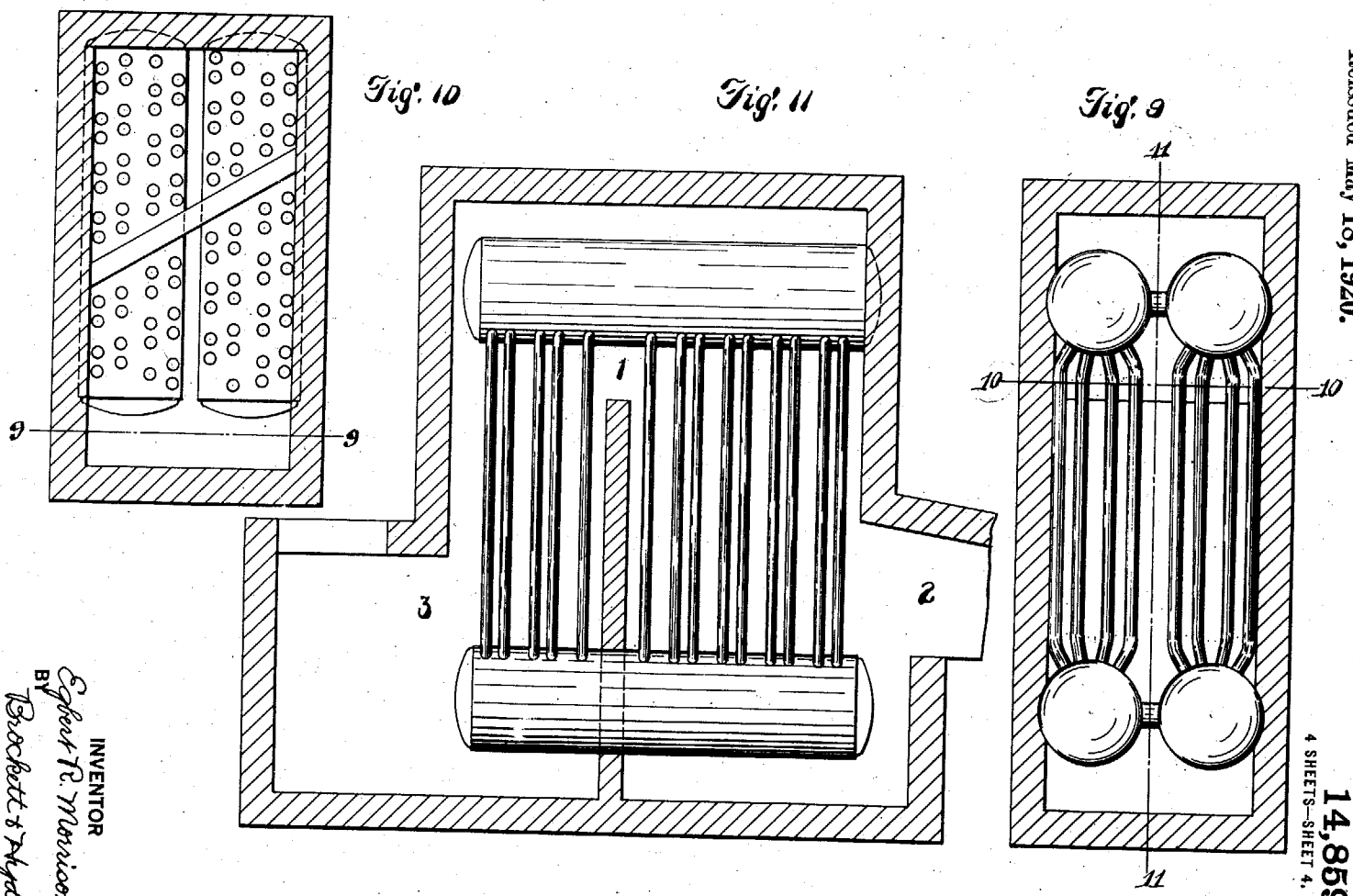
INVENTOR
Egbert R. Morrison
BY
Brockett & Hyde
ATTORNEYS

UNITED STATES PATENT OFFICE.

EGBERT R. MORRISON, OF CLEVELAND, OHIO.

STEAM-BOILER.

14,859. Specification of Reissued Letters Patent. Reissued May 18, 1920.

Original No. 1,304,998, dated May 27, 1919, Serial No. 45,950, filed August 17, 1915. Application for reissue filed March 27, 1920. Serial No. 369,395.

*To all whom it may concern:*

Be it known that I, EGBERT R. MORRISON, a citizen of the United States, formerly residing at Sharon, in the county of Mercer and State of Pennsylvania, and now residing at Cleveland, in the county of Cuyahoga and State of Ohio, have invented certain new and useful Improvements in Steam-Boilers, of which the following is a specification.

My invention relates to water tube boilers and has particular reference to that class of boilers in which there are employed upper and lower headers or drums connected by a plurality of rows, or, banks of vertical tubes.

One of the objects of my invention is to provide an arrangement of tubes which will permit the removal of any tube and the insertion of a new tube without disturbing any other tube and without disturbing the baffle walls.

Another object of my invention is to so arrange the tubes that they will be uniformly and efficiently heated by the hot gases and the heat radiated by the walls in the heating chamber.

A further object of my invention is to provide a construction in which the number of differently bent tubes will be as small as possible, thereby effecting economy in manufacture and repairs.

A further object of my invention is to provide a construction which will permit the use of straight, transverse baffle walls, supported independently of the tubes.

Figure 1:
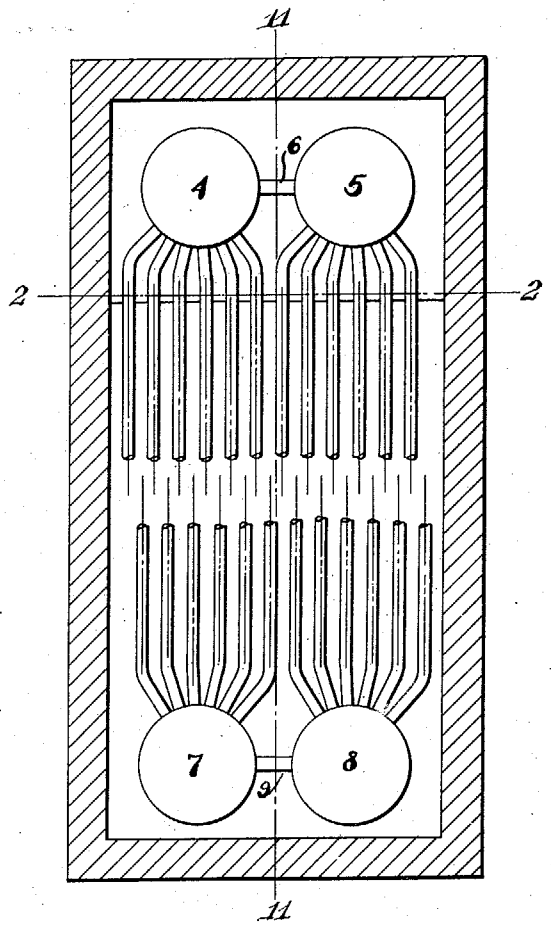
Figure 2:
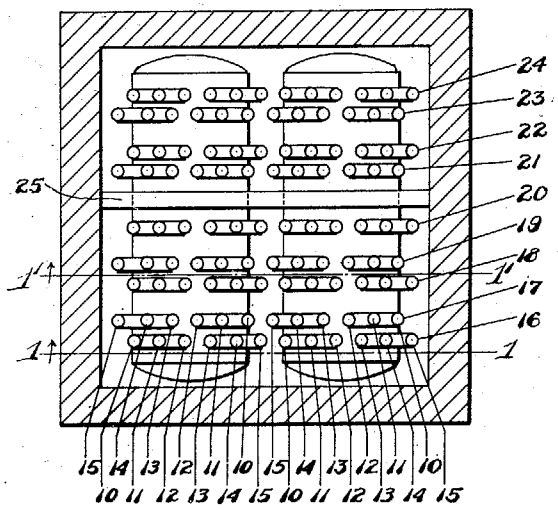
Figure 8:
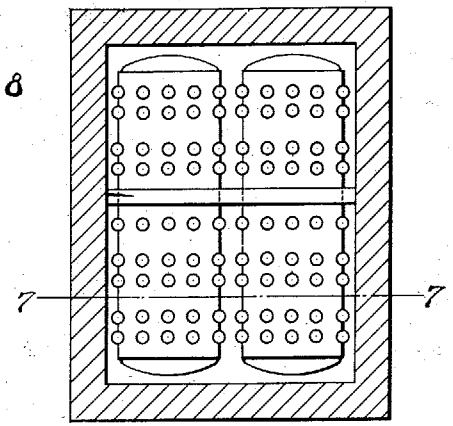
Figure 3:
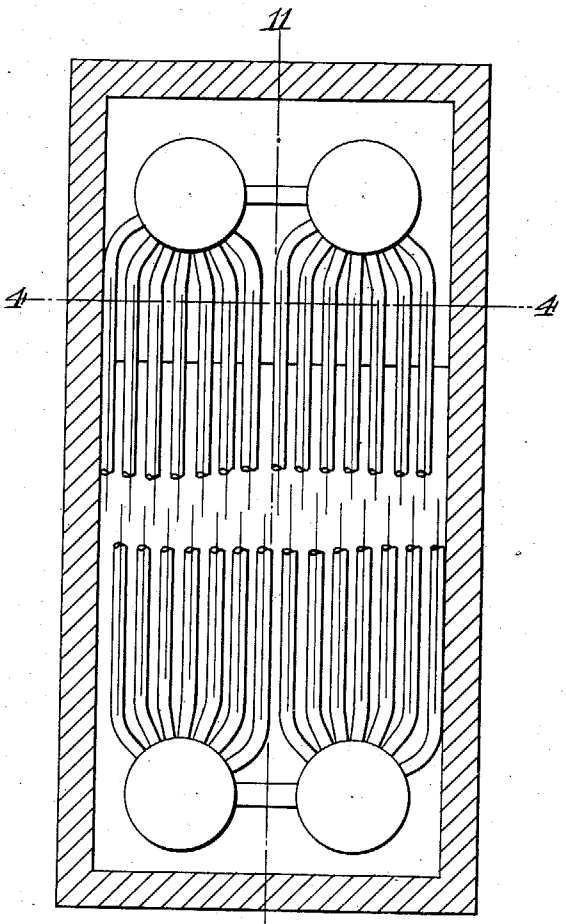
Figure 4:
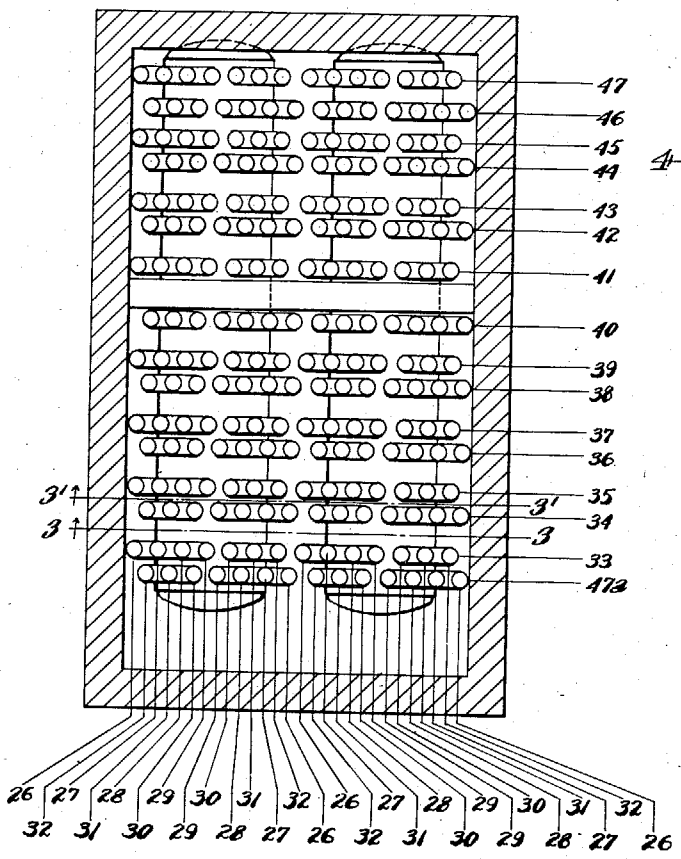

These and other objects are attained by the use of my invention, shown in the accompanying drawings in which Figure 1 is a vertical transverse section partly on line 1—1 and partly on line 1′—1′, Fig. 2, and Fig. 2 is a horizontal section on line 2—2, Fig. 1, of a boiler embodying my invention. Fig. 3 is a vertical transverse section partly on line 3—3, and partly on line 3′—3′, Fig. 4, and Fig. 4 is a horizontal section on line 4—4, Fig. 3, of a boiler similar to that shown in Figs. 1 and 2, but having a modified disposition of drums and tubes as relates to the heating chamber. Fig. 5 is a vertical transverse section, partly on line 5—5, and partly on line 5′—5′, Fig. 6, and Fig. 6 is a horizontal section on line 6—6, Fig. 5, of a boiler having a modified arrangement of tubes. Fig. 7 is a vertical transverse section on line 7—7, Fig. 8, and Fig. 8 is a horizontal section on line 8—8, Fig. 7, of a boiler having a modified arrangement of tubes. Fig. 9 is a vertical transverse section on line 9—9, Fig. 10, and Fig. 10 is a horizontal section on line 10—10, Fig. 9, of a boiler having another arrangement of tubes. Fig. 11 is a vertical longitudinal section of a two pass boiler embodying my improvements. Except for the number and arrangement of transverse rows of tubes shown in Fig. 11, this section may be considered as taken on line 11—11 of any of the vertical transverse sections shown. Fig. 7 and Fig. 8 show a boiler in which the upper and lower drums are alike as regards the holes for receiving the vertical tubes.

From an inspection of the drawings, it will be seen that the drums are arranged longitudinally of the heating chamber, 1, parallel to the general direction of the flow of gases from the fire box, 2, to the stack connection, 3. The tubes which are vertical throughout the greater portion of their length are arranged in parallel longitudinal and parallel transverse rows. The general plan of arrangement of the transverse rows is in pairs, the spaces between the rows in a pair of rows being smaller than the spaces between the rows of adjacent pairs of rows. Or, in other words, the transverse rows of tubes are arranged with alternate wide and narrow spaces between them. The wide spaces permit the removal or insertion of any tube without disturbing any other tube while, by placing two transverse rows of tubes close together in a pair of rows, economy in length of boiler is effected.

For access to the tubes in the transverse rows which are adjacent to the end or baffle walls of the boiler, the employment of only a single row of tubes is preferable, or, if a double row be placed in such position, I prefer to leave a wide space between the wall and the row of tubes which stands next to it. Row 20 and rows 21 and 22, Fig. 2, respectively, illustrate these two arrangements.

I prefer to arrange the tubes in any one transverse row so that they will be spaced practically the same distance apart throughout their straight portions, thus resulting in securing a uniformity in size of all the heat alleys, regardless of the number of drums that may be employed in the same boiler, a feature which is not here claimed as it is covered in my Patent No. 1,061,312 of May 13, 1913. In this former patent, however, the transverse rows of tubes are not straight, continuous and uniformly spaced as in my present invention. In order to reduce the number of differently bent tubes to a minimum and still employ any convenient number of tubes in the transverse rows, I have now devised certain transverse spacing of the tubes where they enter and are secured in the drums, and also throughout the heating chamber which will now be described. The object of this spacing is to permit the dimensions of the boiler to accommodate themselves to any particular size and proportions of space that may be available and still take advantage of the principles of my invention.

For convenience in referring to the drawings, I have indicated similarly bent tubes by the same reference numerals regardless of the positions of the tubes in the boiler. The transverse rows of tubes are numbered consecutively.

In Figs. 1, 2, 3, 4, 5 and 6 the tubes in the transverse rows are shown staggered so that the tubes of alternate rows stand opposite to the spaces between the tubes in the adjacent transverse rows, thus making zig zag longitudinal alleys through which the hot gases must pass on their way through the banks of tubes. In these figures, it will also be seen, the tubes in the longitudinal rows are staggered so that the tubes of alternate rows stand opposite to the spaces between the tubes in the adjacent longitudinal rows.

In Figs. 7, 8, 9 and 10 the adjacent transverse rows of tubes are shown in longitudinal alinement, thus making straight longitudinal alleys for the hot gases, and straight transverse alleys for the manipulation of tubes.

While I prefer to employ the arrangement of tubes which forms the zig zag alleys described above, occasion may arise for using the arrangement which forms the straight alleys for the hot gases, and I do not limit the scope of my invention to either form. There is an advantage to be found in the former, due to the fact that the gases, after passing through the spaces in one transverse row of tubes strike against and are deflected by the tubes in the next row, and, therefore, heat the tubes more efficiently.

In Figs. 3, 4, 7, 8, 9 and 10 the tubes which form the outermost longitudinal rows are shown in close proximity to, or touching the side walls, while, in Figs. 1, 2, 5 and 6 the outermost longitudinal rows of tubes are shown at a distance from the side walls practically equal to the spaces between the tubes in the transverse rows. The latter arrangement is preferable, but in instances where extreme economy of width of boiler setting is necessary to accommodate available space, the former arrangement with outermost tubes standing close to the side walls may be used.

In the boiler shown in Figs. 1 and 2, there are shown two upper drums, 4, 5, connected by tubes 6, and two lower drums, 7 and 8, connected by tubes 9, but the use of these connecting tubes between adjacent drums may be entirely or partly omitted from the boiler. The bank of tubes connecting the drums 4 and 7 is exactly like that which connects drums 5 and 8. It is not necessary, however, that the banks be alike, as they may have unequal numbers of tubes, provided they otherwise conform to my invention. In each bank, each of the transverse rows contains six tubes. A greater or smaller number may be employed if found desirable. Six differently bent tubes, numbered 10 to 15 inclusive, are employed in the boiler shown in Figs. 1 and 2.

The tubes and drums are preferably spaced so as to make the spaces between the tubes practically the same throughout a transverse row, thus forming continuous transverse rows of tubes, uniformly spaced across the heating chamber regardless of the number of separate banks in the same heating chamber. Any convenient number of drums with their banks of tubes may therefore be used in a heating chamber, and still retain the desirable uniformity of heat alleys.

Or, this uniform spacing may be modified by increasing the width of alternate spaces, which would not be detrimental if such spaces were not too greatly increased and would facilitate the inspection and repair of the boiler. Such an arrangement is shown in Fig. 9 and Fig. 10 in which the transverse rows are shown standing oblique to the axes of the drums.

Adjacent rows of transverse tubes in the boiler shown in Figs. 1 and 2 are staggered so that the hot gases passing through the spaces of one row come in contact with the tubes of the next row and impart heat to them. It will be evident to one skilled in the art, that by spacing the rows of tubes in a bank symmetrically with regard to either the transverse or longitudinal axes of the drums of the bank, and by using upper and lower drums of the same diameter, both drums may be made exactly alike, and that in this way all the drums of the entire structure may be made alike, thus simplifying the manufacture of the boiler.

In Fig. 2 the rows of tubes are numbered from front to back, 16 to 24 inclusive. It will be seen that the single row, 20, stands close to the baffle wall, 25, but that any tube in this row may be removed or replaced through the space between rows 19 and 20. The pairs of rows of tubes composed of rows 16 and 17, 21 and 22, 23 and 24, which are adjacent to the setting or baffle walls, are so placed as to leave sufficient space between the wall and the nearest row of tubes to permit any tube to be removed or replaced without disturbing the others. Suitable openings with doors or covers, not shown, will be provided in the sides or top of the setting walls to permit the tubes to be withdrawn or inserted.

In Figs. 3 and 4, I have shown a boiler similar in many respects to that shown in Figs. 1 and 2. In the boiler illustrated in Figs. 3 and 4, there are seven differently bent tubes in each transverse row of a bank and they are numbered 26 to 32 inclusive. There are 16 transverse rows of tubes numbered 33 to 47 inclusive and 47[a]. The outermost tubes, 32, of the two banks shown, stand close to or touch the side walls, and, while preventing the free passage of hot gases around these particular tubes, the width of the boiler setting is somewhat reduced by this arrangement.

In Figs. 5 and 6, I have shown an arrangement of tubes in the transverse rows differing from the arrangements shown in Figs. 1, 2, 3 and 4. In Figs. 5 and 6, there are eight differently bent tubes, numbered 48 to 55 inclusive. There are twelve transverse rows of tubes numbered 56 to 67 inclusive. In this arrangement of tubes, the tubes in alternate rows are staggered. The innermost row of tubes 51 is placed on the center line of the drums, while the adjacent inner rows of tubes 55 are spaced equidistant upon the right and left of the same center line, or, in other words, straddle said line. In this arrangement, also, there are heat alleys left between the side walls and the outermost tubes, 48.

It is evident that boilers may be arranged similarly to those shown in Figs. 5, 6, 7, 8, 9 and 10 except that the heat alleys left between the side walls and the outermost tubes be omitted.

In the staggered row types shown in Figs. 1, 2, 3, 4, 5 and 6, where the transverse rows are in pairs, some of the pairs consist of rows both containing the same number of tubes, others of the pairs consist of rows containing more tubes in one row than in the other. Either arrangement may be used as desired.

In Figs. 5 and 6, tubes 52, are shown on the center line between the two rows of tubes, 53. I have shown tubes 53 alternately attached to the right and left banks, but they may all be attached to either bank or distributed between the banks in any desired proportion.

In Figs. 1 and 2, the inner rows of tubes, 12, 12, and in Figs. 3 and 4, the inner rows of tubes, 29, 29, are shown as standing alternately on opposite sides of the longitudinal center of the drums to which they are connected. In other words, the inner tubes of a bank straddle the longitudinal center line of the drums of the bank.

In Figs. 5 and 6, the tubes 51, are shown only in alternate transverse rows and as standing on the longitudinal center lines of the drums to which they are connected. Tubes 55, 55 of the rows intermediate those containing tubes 51 are shown on opposite sides of or straddling the same center lines.

The drawings clearly show the adaptability and advantages of the principles of my invention. One of the chief advantages lies in the facility with which the proportions of the boiler may be varied to suit available space and still preserve the required amounts of grate and heating surfaces. For instance, in existing plants or in new plants of limited area, requiring a given capacity of boiler, there may be available a narrow space, which would not permit the installation of other types of boilers of the required capacity, but in which my boiler, on account of the ease with which its dimensions of length, breadth and height may be varied without adding to its cost for a given capacity, can be readily installed.

While all of the boilers shown in the drawings are of the two pass type, having only one baffle wall, my improvements may be embodied in boilers of one, three, four or any number of passes and with any number of baffles. I do not limit myself to the employment of two pairs of drums and banks of tubes in one heating chamber as shown in the drawings, or to the same number of tubes or similar arrangement of tubes in the several banks.

It is to be understood that while in several figures of the drawings I have shown the longitudinal and transverse rows of tubes standing at right angles to each other, the longitudinal rows being parallel to and the transverse rows being at right angles to the flow of combustion products, I do not thus limit the scope of my invention, as the transverse rows may be arranged obliquely to the lengthwise direction of the drum as shown in Fig. 10. In cramped quarters or under peculiar conditions such an arrangement may facilitate the removal and replacement of tubes.

It is to be further understood that while the drawings show the upper and lower drums of the same diameter, this is not essential. The lower drums may have different diameters from the upper drums, and neither all of the upper drums nor all of the lower drums need be of the same diameter.

Modifications of my invention other than here shown may occur to those skilled in the art without departing from its scope.

What I claim is:

1. In a water tube boiler having a heating chamber through which the combustion products flow from front to rear; multiple drums located side by side in said chamber and extending lengthwise from front to rear therein, in the same general direction as that of the flow of the combustion products through said chamber; banks of tubes connected to said drums and standing beside each other in said chamber, the banks being so arranged in individual design and in relation to each other that all the alleys between the tubes and extending from front to rear in the same general direction as that of the flow of combustion products are, in the entire structure, or boiler, of practically the same size and shape, such an arrangement existing throughout the greater part of the tube length by reason of the manner of bending the tubes; the tubes being in parallel rows both transversely and longitudinally of the drums, the tubes of one row standing opposite the spaces between the tubes of another row, the transverse rows of tubes being separated by alternate wide and narrow spaces, thus resulting in these rows being largely or entirely grouped in pairs, two of the inner longitudinal rows of a bank straddling the center lines of the drums to which they are connected.

2. In a water tube boiler having a heating chamber through which the combustion products flow from front to rear; multiple drums located side by side in said chamber and extending lengthwise from front to rear therein, in the same general direction as that of the flow of the combustion products through said chamber; banks of tubes connected to said drums and standing beside each other in said chamber, the banks being so arranged in individual design and in relation to each other that all the alleys between the tubes and extending from front to rear in the same general direction as that of the flow of combustion products are, in the entire structure, or boiler, of practically the same size and shape, such an arrangement existing throughout the greater part of the tube length by reason of the manner of bending the tubes; the tubes being in parallel rows both transversely and longitudinally of the drums, the tubes of one row standing opposite the spaces between the tubes of another row, the transverse rows of tubes being separated by alternate wide and narrow spaces, thus resulting in these rows being largely or entirely grouped in pairs, the innermost longitudinal row of a bank being on the center lines of the drums to which the tubes of said innermost row are connected.

In testimony whereof I affix my signature.

EGBERT R. MORRISON.